United States Patent
Lu et al.

(10) Patent No.: US 11,036,555 B2
(45) Date of Patent: Jun. 15, 2021

(54) VIRTUAL PROCESSOR ALLOCATION WITH EXECUTION GUARANTEE

(71) Applicant: VMware, Inc., Palo Alto, CA (US)

(72) Inventors: Xunjia Lu, Los Altos, CA (US); Haoqiang Zheng, Cupertino, CA (US); Bi Wu, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 163 days.

(21) Appl. No.: 16/045,062

(22) Filed: Jul. 25, 2018

(65) Prior Publication Data

US 2020/0034202 A1 Jan. 30, 2020

(51) Int. Cl.
*G06F 9/48* (2006.01)
*G06F 9/50* (2006.01)
*G06F 9/455* (2018.01)
*H04L 12/24* (2006.01)

(52) U.S. Cl.
CPC ........ *G06F 9/5038* (2013.01); *G06F 9/45558* (2013.01); *G06F 9/4881* (2013.01); *H04L 41/0896* (2013.01); *H04L 41/5003* (2013.01)

(58) Field of Classification Search
None
See application file for complete search history.

(56) References Cited

U.S. PATENT DOCUMENTS

| | | | | |
|---|---|---|---|---|
| 7,783,779 B1 * | 8/2010 | Scales | ........... | G06F 9/5077 709/207 |
| 8,266,275 B2 * | 9/2012 | Xu | ........... | G06F 9/485 709/224 |
| 8,826,270 B1 * | 9/2014 | Lewis | ........... | G06F 9/45558 718/1 |
| 8,839,256 B2 | 9/2014 | Achilles et al. | | |
| 8,856,783 B2 * | 10/2014 | Sharp | ........... | G06F 9/45558 718/1 |
| 2009/0222558 A1 * | 9/2009 | Xu | ........... | G06F 9/485 709/224 |
| 2012/0036512 A1 | 2/2012 | Chung et al. | | |
| 2012/0089980 A1 * | 4/2012 | Sharp | ........... | G06F 9/45558 718/1 |
| 2014/0157038 A1 | 6/2014 | Ashok et al. | | |
| 2015/0058861 A1 | 2/2015 | Zheng et al. | | |
| 2018/0101486 A1 | 4/2018 | Lu et al. | | |
| 2018/0136976 A1 | 5/2018 | Ammari et al. | | |
| 2020/0034201 A1 | 1/2020 | Lu et al. | | |

* cited by examiner

*Primary Examiner* — Van H Nguyen
(74) *Attorney, Agent, or Firm* — Patterson + Sheridan, LLP

(57) ABSTRACT

The disclosure provides a method of performing a workload on a virtual machine (VM) executing on a host comprising one or more physical central processing units (pCPUs) is provided. The method further includes setting a quality of service (QoS) metric associated with the VM, the QoS metric indicating a time period. The method further includes setting a bandwidth metric associated with the VM, the bandwidth metric indicating a percentage. The method further includes allocating by a central processing unit (CPU) scheduler to a virtual CPU (vCPU) of the VM one of the one or more pCPUs periodically every time period, wherein for every time period the one of the one or more pCPUs is allocated to the vCPU for a duration that is the percentage of the time period based on the QoS metric and the bandwidth metric. The method further includes executing the workload on the virtual machine with the vCPU according to the allocation of the one or more pCPUs.

20 Claims, 3 Drawing Sheets

VIRTUAL PROCESSOR ALLOCATION WITH EXECUTION GUARANTEE

BACKGROUND

Software defined networking (SDN) comprises a plurality of hosts in communication over a physical network infrastructure, each host having one or more virtual computing instances (VCIs) such as virtual machines (VMs) or containers that are connected to logical overlay networks that can span multiple hosts and are decoupled from the underlying physical network infrastructure. Though certain aspects herein are described with respect to VMs, it should be noted that the same aspects may be similarly used for other types of VCIs.

Virtualization software such as a hypervisor facilitates the creation and execution of VMs on a host. Hypervisors serve as an interface between VMs and the hardware resources of the hosts. A hypervisor can abstract processor, memory, storage, and networking resources of a host to allocate the host's hardware resources to multiple VMs.

For example, a host may have one or more physical CPUs (pCPUs). Each of the one or more pCPUs may be capable of operating at a particular frequency (e.g., measured in MHz, GHz, etc.). Further, different pCPUs may be capable of operating at the same or different frequencies. Similarly, each VM on a host may be defined as having one or more vCPUs. Different VMs may have the same or different number of vCPUs. A vCPU is seen by a VM as a physical CPU core by the VM's operating system. The hypervisor abstracts pCPU resources of the host into the vCPUs used by the VMs.

In particular, a hypervisor allocates pCPU resources of a host to a VM (i.e., to vCPUs of a VM), in part, using configuration metrics. Physical CPU resources of the host are allocated using CPU resource allocation metrics such as a CPU reservation resource allocation metric (e.g., referred to as a reservation metric), a CPU limit resource allocation metric (e.g., referred to as a limit metric), and a CPU shares resource allocation metric (e.g., referred to as a shares metric) as explained below.

A CPU reservation resource allocation metric for a VM provides a guarantee of pCPU resources for the VM. In particular, a CPU reservation resource allocation metric is typically specified in MHz, and is a guarantee for clock cycles per second of pCPUs of a host (e.g., divided across any number of pCPUs of the host). As discussed, each of the pCPUs of a host may operate at a particular frequency. The sum of the frequencies of the pCPUs of the host corresponds to the total frequency or total clock cycles per second available at the host. A CPU reservation resource allocation metric guarantees a portion of the total frequency available at the host to the VM, meaning the portion of the total frequency available at the host for the VM is guaranteed as divided among the vCPUs of the VM. Accordingly, when a CPU reservation resource allocation metric provides a reservation for a certain amount of clock cycles for a certain VM, a CPU scheduler will guarantee the pCPU resources (e.g., 1 GHz of pCPU clock cycles per second of the host) to the VM provided by the CPU reservation resource allocation metric.

Typically, when the VM is not using all of its reserved pCPU resources, the pCPU resources are not wasted by the host, but rather the hypervisor can allocate them serially or concurrently to other VMs. Thus a CPU reservation resource allocation metric is used to provide a VM access to pCPUs of the host to support vCPUs in a committed environment (e.g., the pCPU is also reserved by other VMs). It will be appreciated that because VMs typically do not use all of the pCPU resources allocated by a hypervisor, a hypervisor may allocate pCPU resources to a plurality of VMs so long as the total workload for all VMs will not exceed the pCPU resources at any given time. It will be further appreciated that a CPU reservation resource allocation metric may also be specified in a percent of pCPU resources (e.g., a 50% reservation of clock cycles of pCPUs of a host). It will be appreciated that a pCPU may refer to a core of a CPU.

A CPU limit resource allocation metric is typically specified in MHz and sets an upper maximum amount of pCPU resources that can be allocated to a VM. More specifically, the CPU limit resource allocation metric prevents a VM from using more clock cycles per second of pCPUs of the host (e.g., divided across any number of pCPUs of the host) than the CPU limit resource allocation metric provides even if more clock cycles per second are not being used and are available. In this case, the VM's performance is restricted by the CPU limit resource allocation metric even though the host has further capacity. This is used to prevent a VM from using too much of a host's resources at any given time. It will be further appreciated that a CPU limit resource allocation metric may also be specified in a percent of pCPU resources.

A CPU shares resource allocation metric provides a number of shares of a VM. For example, a VM is typically configured with a certain number of shares (e.g., 1000 shares) by a hypervisor. In a default setting, each VM may be configured with an equal number of shares, but it will be appreciated that the number of shares can be allocated using a hypervisor as needed for the VMs (e.g., to prioritize a first VM over a second VM). The CPU shares resource allocation metric is used to govern CPU resource distribution as long as other resource allocation metrics are not violated. Thus, the CPU shares resource allocation metric provides a selection mechanism for access to the pCPUs by providing a relative importance level between VMs. In certain aspects, when there is a case of contention for pCPU resources, a first VM associated with a higher number of shares gets access to the pCPU resources over a second vCPU associated with a lower number of shares. In other aspects, when there is a case of contention for pCPU resources, vCPUs get access to the pCPU resources proportionality to the number of shares associated with each vCPU (e.g., $vCPU_1$ of $VM_1$ with an allocated 1000 shares gets half the amount of pCPU resources as $vCPU_2$ of $VM_2$ with an allocated 2000 shares).

The CPU resource allocation metrics described above can result in vCPU latency for VMs of about hundreds of milliseconds or more, meaning there may be hundreds of milliseconds or more of time in between when a VM requests use of a vCPU for processing a workload and when pCPU resources are actually made available to the vCPU for processing the workload. Further, the vCPUs also experience unbounded (or random) jitter as the latency may vary over time from hypervisor contexts. This is because the current CPU resource allocation metrics are based on overall utilization (throughput) of pCPUs of a host. For example, as discussed, the hypervisor may have overcommitted the pCPU resources of a host. In this case, the hypervisor may not be able to provide all VMs with the requested pCPU resources at a given time. It will be appreciated that this can cause poor performance (e.g., high latency) when processing a workload on a VM. It will be appreciated that this can lead to situations where certain VMs have to wait for an unreasonable amount of time for the pCPU resources. It will be further appreciated, that the above CPU resource allocation metrics do not provide a latency guarantee.

Such jitter and latency may not be suitable for executing certain workloads. For example, workloads in internet connected devices (e.g., IoT Edge gateway devices, etc.) and network functions virtualization (NFV) in data driven industries, such as the telecommunications industry, often require certain quality of service (QoS) standards (e.g., performance, availability, and reliability) to meet a certain service level agreement (SLA). In order to execute such workloads in VMs, this translates into needing a predictable responsiveness of such VMs with controlled latency and jitter that meets the SLA criteria. For example, SLA in the telecommunications industry for NFV often requires millisecond or even sub-millisecond CPU latency with predictable performance (e.g., an error ratio of one bit error in $10^6$).

Current solutions for meeting certain SLAs for a workload executing in a VM include a CPU resource allocation that dedicates at least one pCPU in a host for each vCPU of the VM executing the workload. This is referred to as physical core pinning, and it is associated with certain drawbacks including higher associated costs and efficiency losses. Physical core pinning is associated with higher costs and efficiency losses, in part, because the dedicated pCPU can no longer be time-shared across multiple vCPUs such as across multiple VMs, forgoing a significant benefit to using vCPUs. Thus there exists a need to provide execution of workloads on a VM while meeting certain CPU QoS requirements (e.g., SLA QoS requirements of millisecond or sub-millisecond latency), without the need to pin a vCPU to a pCPU.

SUMMARY

The present disclosure provides techniques to execute a workload on a VM that satisfies a CPU QoS requirement without the need to exclusively dedicate a pCPU of a host to a single vCPU of the VM.

In certain aspects, a method of performing a workload on a virtual machine (VM) executing on a host comprising one or more physical central processing units (pCPUs) is provided. The method further includes setting a quality of service (QoS) metric associated with the VM, the QoS metric indicating a time period. The method further includes setting a bandwidth metric associated with the VM, the bandwidth metric indicating a percentage. The method further includes allocating by a central processing unit (CPU) scheduler to a virtual CPU (vCPU) of the VM one of the one or more pCPUs periodically every time period, wherein for every time period the one of the one or more pCPUs is allocated to the vCPU for a duration that is the percentage of the time period based on the QoS metric and the bandwidth metric. The method further includes executing the workload on the virtual machine with the vCPU according to the allocation of the one or more pCPUs.

Further embodiments include a non-transitory computer-readable storage medium storing instructions that, when executed by a computing system, cause the computing device to perform the method set forth above, and a computing system programmed to carry out the method set forth above.

Further embodiments include a computing system configured to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides techniques to execute a workload with a vCPU of VM that satisfies a CPU QoS requirement without the need to exclusively dedicate a pCPU of a host to a single vCPU of the VM.

Figure 1A:
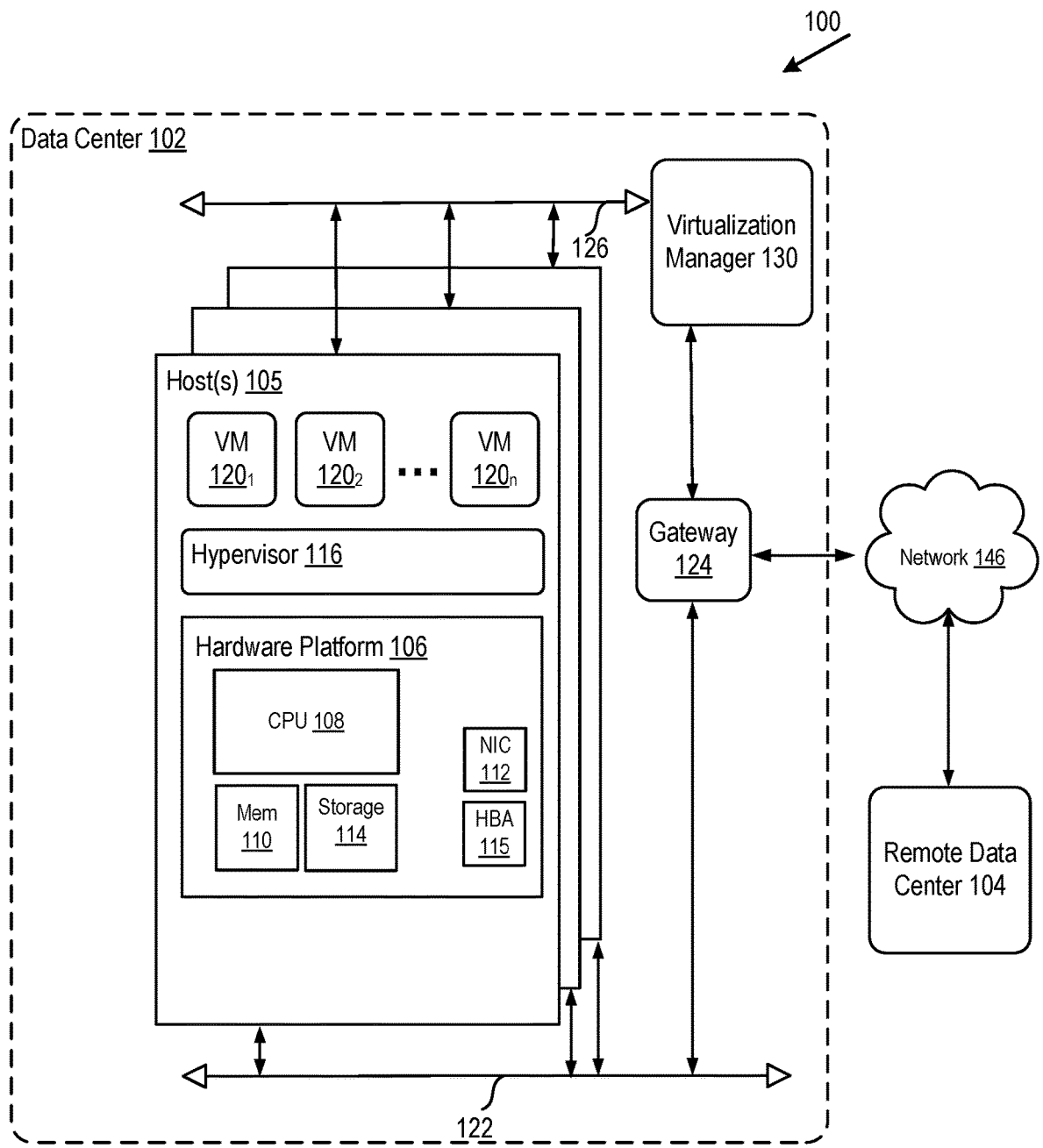
FIG. 1A depicts a block diagram of a computer system in accordance with certain aspects of the disclosure.

FIG. 1A depicts a block diagram of a computer system 100 in which one or more embodiments of the present disclosure may be utilized. Data center 102 may be a local data center or have one or more components located in a cloud data center. Data center 102 includes host(s) 105, a gateway 124, a virtualization manager 130, a management network 126, and a data network 122. Each of hosts 105 is typically on a server grade hardware platform 106, such as an x86 based hardware platform. Hosts 105 may be geographically co-located servers on the same rack or on different racks in data center 102.

Host 105 is configured with a virtualization layer, referred to here as a hypervisor 116, that abstracts processor, memory, storage, and networking resources of hardware platform 106 into multiple virtual machines $120_1$ to $120_n$ (collectively referred to as VMs 120 and individually referred to as VM 120). VMs 120 on the same host 105 may use any suitable overlaying guest operating system(s) and run concurrently with the other VMs 120.

Hypervisor 116 architecture may vary. In some aspects, hypervisor 116 is installed as system level software directly on hosts 105 and conceptually interposed between the physical hardware and guest operating systems in VMs 120. Alternatively, hypervisor 116 may conceptually run "on top of" guest operating systems in VMs 120. In some implementations, hypervisor 116 may comprise system level software as well as a privileged VM machine (not shown) that has access to the physical hardware resources of the host 105. In this implementation, a virtual switch, virtual tunnel endpoint (VTEP), etc., along with hardware drivers, may reside in the privileged VM. One example of hypervisor 116 that may be used is a VMware ESXi™ hypervisor provided as part of the VMware vSphere® solution made commercially available from VMware, Inc. of Palo Alto, Calif.

Hardware platform 106 of each host 105 may include components of a computing device such as one or more processors (CPUs) 108, system memory 110, a network interface 112, a storage system 114, a host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as data network 122 and/or management network 126. Network interface 112 may include one or more network adapters or ports, also referred to as Network Interface Cards (NICs), for connecting to one or more physical networks.

Gateway 124 (e.g., executing as a virtual appliance) provides VMs 120 and other components in data center 102 with connectivity to network 146 used to communicate with other devices (e.g., a remote data center 104). In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical network, but different network segments, such as different subnets or different logical VLAN segments.

System memory 110 is hardware for allowing information, such as executable instructions, configurations, and other data, to be stored and retrieved. Memory 110 is where programs and data are kept when CPU 108 is actively using them. Memory 110 may be volatile memory or non-volatile memory. Host bus adapter (HBA) 115 couples host 105 to one or more external storages (not shown), such as a storage area network (SAN) or distributed virtual SAN. Other external storages that may be used include network-attached storage (NAS) and other network data storage systems, which may be accessible via NIC 112. Storage system 114 represents persistent storage device(s). Storage 114 may be one or more hard disks, flash memory modules, solid state disks, and/or optical disks. Although storage 114 is shown as being local to host 105, storage 114 may be external to host 105, such as by connection via HBA 115.

Virtualization manager 130 communicates with hosts 105 via a network, shown as a management network 126, and carries out administrative tasks for data center 102 such as managing hosts 105, managing local VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a VM in one of hosts 105. One example of a virtualization manager is the vCenter Server™ product made available from VMware, Inc.

Figure 1B:
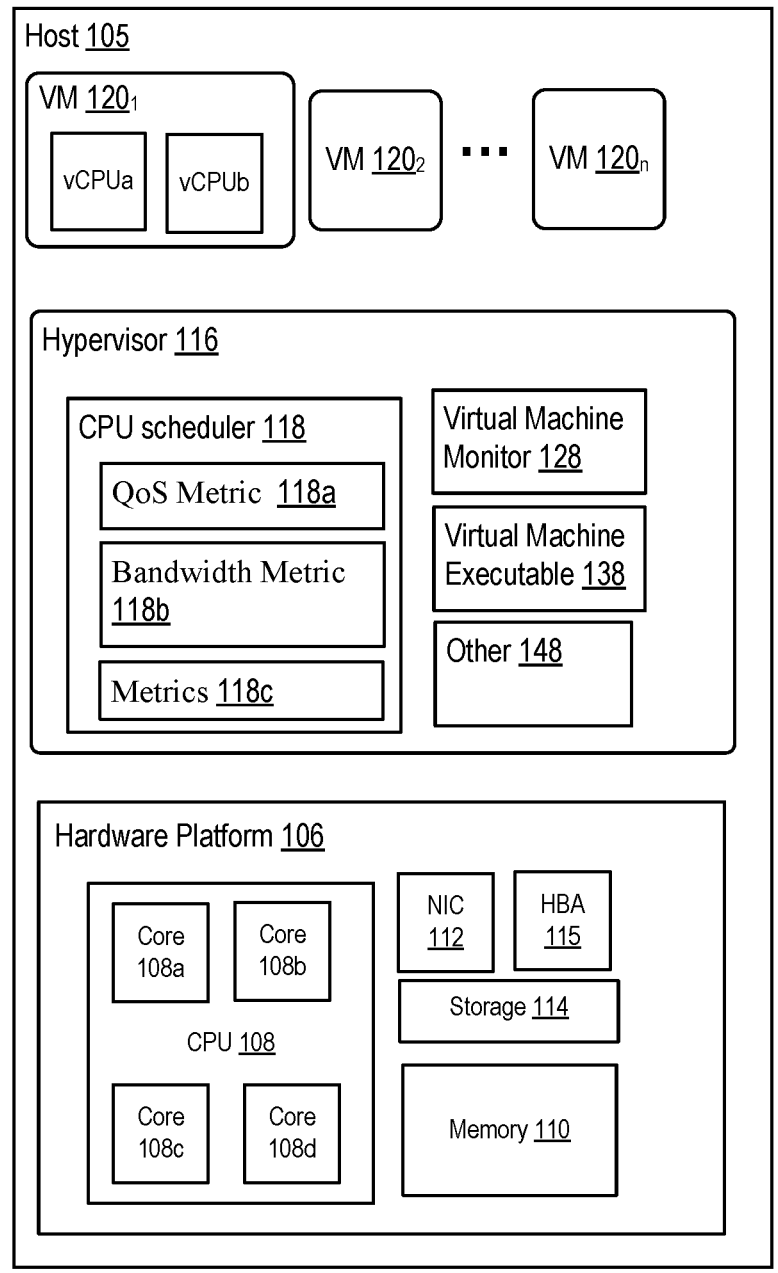
FIG. 1B is an expanded view of a host computer in accordance with certain aspects of the disclosure.

FIG. 1B depicts an expanded view of hypervisor 116 in host 105 from FIG. 1 in accordance with certain aspects of the disclosure. Host 105 includes VM 120$_1$ configured with two vCPUs, vCPUa and vCPUb. It will be appreciated that VMs 120 may be configured with a single vCPU or a plurality of vCPUs by hypervisor 116. It will be further appreciated that vCPUa and vCPUb are virtual processors that are allocated pCPU resources from hardware platform 106, of host 105, by hypervisor 116.

Virtual machine monitor (VMM) 128 is a process that runs in a kernel of hypervisor 116 that is responsible for virtualizing the guest operating system instructions, and manages memory. In certain aspects, there is a VMM for each vCPU assigned to each VM 120. A VMM passes storage and network I/O requests to the hypervisor 116, and passes other requests to a virtual machine executable (VMX) 138 process.

VMX 138 is a process that runs in a kernel of hypervisor 116 that is responsible for handling I/O to devices and communicating with user interfaces, snapshot managers, and remote consoles, etc.

Hypervisor 116 includes a CPU scheduler 118 for allocating pCPU resources to VMs 120. In certain aspects, all workloads running in VMs 120 must be scheduled for execution by CPU scheduler 118. It will be appreciated that a processor (e.g., CPU 108) is commonly equipped with multiple cores (e.g., cores 108$a$-$d$) and hyper threading technology. In certain aspects, each core 108$a$-$d$ may be considered a separate pCPU. Accordingly, each host 105 in data center 102 can include a plurality of pCPUs and support a plurality of VMs. Thus in certain aspects, data center 102 can support several (e.g., thousands or more) VMs 120 including several (e.g., thousands or more) of vCPUs.

In order to execute a workload with a vCPU of a VM that satisfies a CPU QoS requirement without the need to exclusively dedicate a pCPU of a host to a single vCPU of the VM, CPU scheduler 118 is configured to allocate pCPU resources using one or more of the following CPU resource allocation metrics: a QoS metric 118$a$ (e.g., referred to as sched.cpu.qos) and a bandwidth metric 118$b$ (e.g., referred to as sched.cpu.min). The CPU scheduler 118, in some embodiments, additionally is configured to allocate pCPU resources using metrics 118$c$ (e.g., one or more of reservation, limit, and shares). In certain aspects, CPU scheduler 118 only uses QoS metric 118$a$ and bandwidth metric 118$b$ for a subset of pCPU resources of host 105, and metrics 118$c$ for any remaining pCPU resources. It will be appreciated that in certain aspects, bandwidth metric 118$b$ or a CPU reservation resource allocation metric may specify a CPU reservation in percentage. It will be further appreciated that both a CPU shares resource allocation metric and QoS metric 118$a$ may be used to illustrate relative importance amongst VMs, and QoS metric 118$a$ may be used to define relative importance in terms of throughput, utilization, responsiveness, and execution latency.

QoS metric 118$a$ is set/used by CPU scheduler 118 to schedule vCPU execution into periodic time periods (e.g., microseconds (μs)). Accordingly, the QoS metric 118$a$ is used by CPU scheduler 118 to define the frequency of a vCPU's execution and may be expressed as a time period. For example, where the value of QoS metric 118$a$ associated with a vCPU is 10,000 μs, the vCPU is guaranteed pCPU resources of a pCPU every 10 ms so the vCPU can execute a workload every 10 ms. It should be noted that the pCPU resources may be from the same pCPU each time period, or different pCPUs may be used at different time periods. In certain embodiments, a separate QoS metric 118$a$ can be defined for each vCPU of each VM. In certain embodiments, a separate QoS metric 118$a$ can be defined for each VM and corresponds to all vCPUs of the VM.

Bandwidth metric 118$b$ is set/used by CPU schedule 118 to provide a reservation as a percentage of pCPU resources of a pCPU for a vCPU. For example, where the value of bandwidth metric 118$b$ is 50%, then 50% of the bandwidth of the pCPU used for executing the vCPU is guaranteed to the vCPU. In particular, in certain embodiments, the QoS metric 118$a$ and bandwidth metric 118$b$ are expressed as a pair (e.g., 10,000 μs, 50%). Accordingly, the bandwidth metric 118$b$ indicates the percentage of the periodic time period indicated in the QoS metric 118$a$ that is guaranteed to the vCPU associated with the QoS metric 118$a$. For example, where the QoS metric 118$a$ and bandwidth metric 118$b$ pair is (10,000 μs, 50%), a vCPU associated with the QoS metric 118$a$ is guaranteed to run (e.g., execute a workload) on a pCPU for 5 ms every 10 ms.

In certain embodiments, CPU scheduler 118 dispatched by hypervisor 116 configures each of at least one vCPU (e.g., vCPUa of VM 120$_1$) with a bandwidth metric 118$b$ guaranteeing a certain percentage of pCPU resources (e.g., a percentage of one of cores 108$a$-$d$ of CPU 108 at a time) within a certain time period indicated by QoS metric 118$a$. Accordingly, CPU scheduler 118 allocates to a vCPU of a VM one of one or more pCPUs periodically every time period, wherein for every time period the one of the one or more pCPUs is allocated to the vCPU for a duration that is the percentage of the time period based on the QoS metric 118a and the bandwidth metric 118b. For example, if CPU 108 in host 105 is a four core processor, and CPU scheduler 118 dispatched by hypervisor 116 configures vCPUa of VM $120_1$ with bandwidth metric 118b of 50% reservation, and QoS metric 118a of 10,000 μs (i.e., 10 milliseconds (ms)), then vCPUa of VM $120_1$ will run on one of cores 108a-108d in CPU 108 for at least 5 ms every 10 ms time period, provided vCPUa has sufficient demand. In certain aspects, a vCPU is not constrained to a specific portion according to the bandwidth metric 118b of the time period indicated by the QoS metric 118a and can be allocated time anywhere within the time period up to the percentage. In certain embodiments, a vCPU is allocated a pCPU for a continuous duration within the time period up to the percentage. In certain embodiments, a vCPU is allocated a pCPU for a discontinuous duration (i.e., the duration spans multiple discontinuous periods of time) within the time period up to the percentage. For example, vCPUa is not constrained to a specific 5 ms time period within the periodic 10*ms* time periods defined by QoS metric 118a and any 5 ms of the 10 ms can be scheduled for execution of a workload by vCPUa. Thus, it will be appreciated that QoS metric 118a provides a frequency of execution (periodic time periods) for executing a workload using a percentage of a pCPU resources of a pCPU provided by bandwidth metric 118b as deployed by CPU scheduler 118.

In certain aspects a QoS of a vCPU is satisfied if and only if its execution meets the requirements defined by the QoS metric 118a and bandwidth metric 118b. In certain aspects, a vCPU is considered "jitterless" when its execution substantially always meets the requirements defined by the QoS metric 118a and bandwidth metric 118b when processing a workload. It will be appreciated that it is typically easier to achieve a jitterless vCPU in a $VM_1$ with a higher QoS metric 118a and a lower bandwidth metric 118b (e.g., 100 ms, 0.1%) than a vCPU in a $VM_2$ with a lower QoS metric 118a and a higher bandwidth metric 118b (e.g., 100 μs, 50%) because even though $VM_2$ has a larger reservation percentage for the pCPU resources, the time period is smaller resulting in less total clock cycles for $VM_2$ to process a workload.

It will be appreciated that QoS metric 118a and bandwidth metric 118b may be used in connection with a distributed resource scheduler (DRS) without deviating from the scope of the disclosure. A DRS (e.g., VMware vSphere® DRS made commercially available from VMware, Inc. of Palo Alto, Calif.) is a scheduler that is used to schedule workloads across VMs, for example across VMs on different host machines (e.g., VMs 120 on hosts 105 in FIG. 1A).

Figure 2:
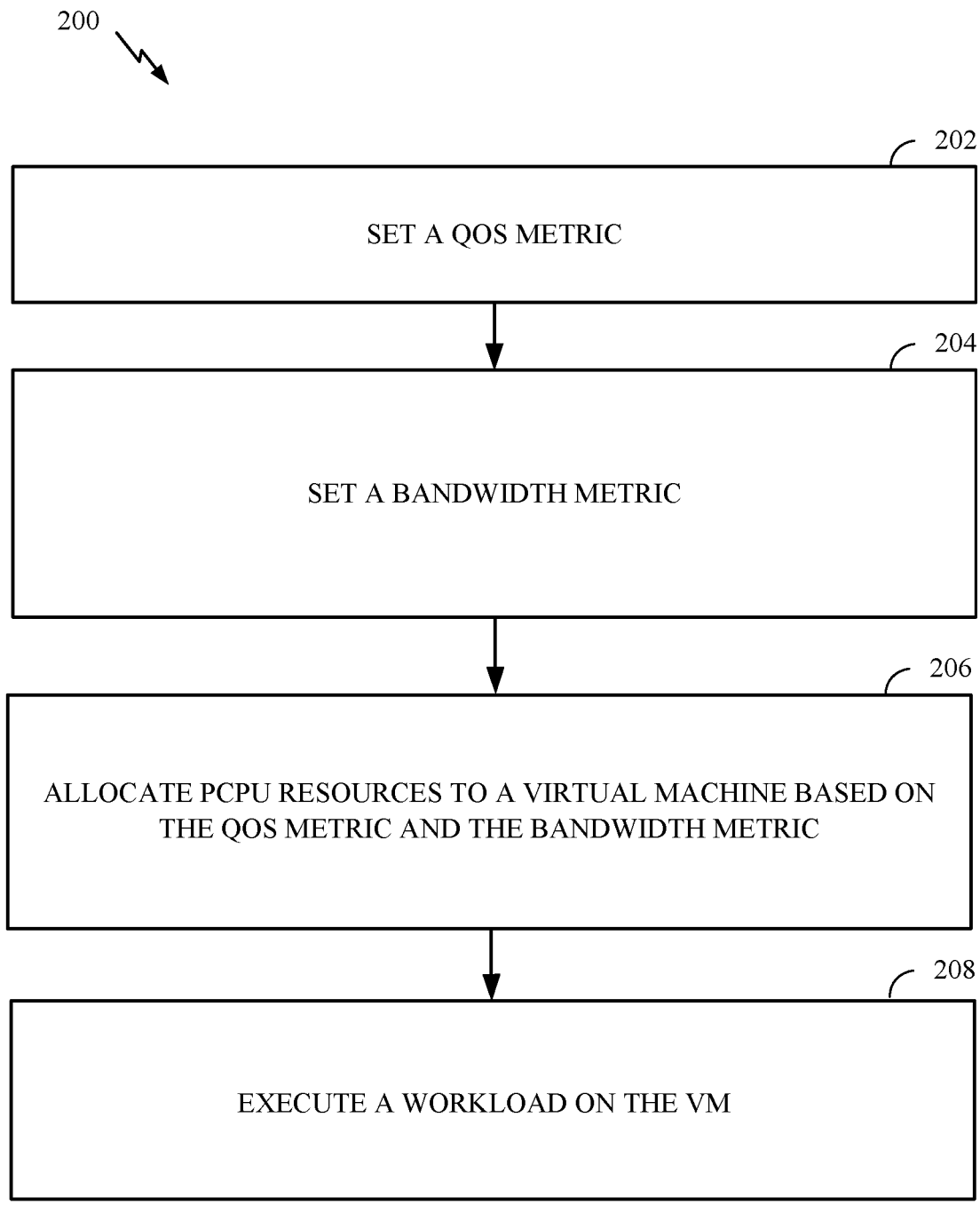
FIG. 2 depicts a flow diagram of a method of performing a workload, in accordance with certain aspects of the disclosure.

FIG. 2 depicts a flow diagram of a method 200 for performing a workload in a time period based on QoS metric 118a according to certain aspects of the disclosure.

At block 202, a QoS metric is set. For example, a hypervisor associated with a VM (e.g., hypervisor 116 associated with VM $120_1$ in host 105 in FIG. 1B) deploys a CPU scheduler (e.g., CPU scheduler 118 in FIG. 1B). An administrator may set the QoS metric in a CPU scheduler interface (e.g., by setting a time period) or a hypervisor interface. In certain aspects, a default time period may be used (e.g., 10,000 μs). In other aspects, a user may set the QoS metric.

At block 204, a bandwidth metric is set. An administrator may set the bandwidth metric in a CPU scheduler interface (e.g., by setting a percentage of pCPU resources) or a hypervisor interface. In certain aspects, a default percentage of pCPU resources may be used (e.g., 50%). In other aspects, a user may set the percentage of pCPU resources.

At block 206, the CPU scheduler that was set above in block 202 and 204 (e.g., by an administrator) allocates pCPU resources to a vCPU of a VM based on the QoS metric and the bandwidth metric allocation metric. For example, the CPU scheduler may allocate 10,000 μs time periods and 50% pCPU resources to execute a workload. At block 208, the VM executes the workload within the QoS time period using the allocated parentage of pCPU resources.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of performing a workload on a virtual machine (VM) executing on a host comprising one or more physical central processing units (pCPUs), the method comprising:
    setting a quality of service (QoS) metric associated with the VM, the QoS metric indicating a time period for executing a virtual CPU (vCPU) of the VM on the one or more pCPUs;
    setting a bandwidth metric associated with the VM, the bandwidth metric indicating a percentage of pCPU resources of the one or more pCPUs for executing the vCPU of the VM;
    allocating by a central processing unit (CPU) scheduler to the vCPU of the VM one of the one or more pCPUs periodically every time period, wherein for every time period the one of the one or more pCPUs is allocated to the vCPU for a duration that is the percentage of the time period based on the QoS metric and the bandwidth metric; and
    executing the workload on the virtual machine with the vCPU according to the allocation of the one or more pCPUs.

2. The method of claim 1, wherein the VM comprises a plurality of vCPUs, and wherein the QoS metric and the bandwidth metric are associated with each of the plurality of vCPUs.

3. The method of claim 1, wherein the VM comprises a plurality of vCPUs, and wherein the QoS metric and the bandwidth metric are associated with only one vCPU.

4. The method of claim 1, wherein the one or more pCPUs comprise one or more CPU cores of one or more CPUs.

5. The method of claim 1, wherein the vCPU is allocated a same one of the one or more pCPUs for different periodic time periods.

6. The method of claim 1, wherein the vCPU is allocated a different one of the one or more pCPUs for different periodic time periods.

7. The method of claim 1, wherein for a first time period of the every time period, the one of the one or more pCPUs is allocated to the vCPU for a continuous duration.

8. The method of claim 1, wherein for a first time period of the every time period, the one of the one or more pCPUs is allocated to the vCPU for a discontinuous duration.

9. A non-transitory computer readable medium comprising instructions to be executed in a processor of a computer system, and the instructions when executed in the processor cause the computer system to carry out a method of performing a workload on a virtual machine (VM) executing on a host comprising one or more physical central processing units (pCPUs), the method comprising:
    setting a quality of service (QoS) metric associated with the VM, the QoS metric indicating a time period for executing a virtual CPU (vCPU) of the VM on the one or more pCPUs;
    setting a bandwidth metric associated with the VM, the bandwidth metric indicating a percentage of pCPU resources of the one or more pCPUs for executing the vCPU of the VM;
    allocating by a central processing unit (CPU) scheduler to the vCPU of the VM one of the one or more pCPUs periodically every time period, wherein for every time period the one of the one or more pCPUs is allocated to the vCPU for a duration that is the percentage of the time period based on the QoS metric and the bandwidth metric; and executing the workload on the virtual machine with the vCPU according to the allocation of the one or more pCPUs.

10. The non-transitory computer readable medium of claim 9, wherein the VM comprises a plurality of vCPUs, and wherein the QoS metric and the bandwidth metric are associated with each of the plurality of vCPUs.

11. The non-transitory computer readable medium of claim 9, wherein the VM comprises a plurality of vCPUs, and wherein the QoS metric and the bandwidth metric are associated with only one vCPU.

12. The non-transitory computer readable medium of claim 9, wherein the one or more pCPUs comprise one or more CPU cores of one or more CPUs.

13. The non-transitory computer readable medium of claim 9, wherein the vCPU is allocated a same one of the one or more pCPUs for different periodic time periods.

14. The non-transitory computer readable medium of claim 9, wherein the vCPU is allocated a different one of the one or more pCPUs for different periodic time periods.

15. The non-transitory computer readable medium of claim 9, wherein for a first time period of the every time period, the one of the one or more pCPUs is allocated to the vCPU for a continuous duration.

16. The non-transitory computer readable medium of claim 9, wherein for a first time period of the every time period, the one of the one or more pCPUs is allocated to the vCPU for a discontinuous duration.

17. A computer system comprising:
a memory; and
one or more physical central processing units (pCPUs), the memory and the one or more pCPUs configured to:
set a quality of service (QoS) metric associated with a virtual machine (VM), the QoS metric indicating a time period for executing a virtual CPU (vCPU) of the VM on the one or more pCPUs;
set a bandwidth metric associated with the VM, the bandwidth metric indicating a percentage of pCPU resources of the one or more pCPUs for executing the vCPU of the VM;
allocate by a central processing unit (CPU) scheduler to the vCPU of the VM one of the one or more pCPUs periodically every time period, wherein for every time period the one of the one or more pCPUs is allocated to the vCPU for a duration that is the percentage of the time period based on the QoS metric and the bandwidth metric; and
execute the workload on the virtual machine with the vCPU according to the allocation of the one or more pCPUs.

18. The computing system of claim 17, wherein the VM comprises a plurality of vCPUs, and wherein the QoS metric and the bandwidth metric are associated with each of the plurality of vCPUs.

19. The computing system of claim 17, wherein the VM comprises a plurality of vCPUs, and wherein the QoS metric and the bandwidth metric are associated with only one vCPU.

20. The computing system of claim 17, wherein the one or more pCPUs comprise one or more CPU cores of one or more CPUs.

* * * * *